HALF/FULL TRACK MAGNETIC RECORDING

Filed Aug. 14, 1957

INVENTORS
JOSEPH W. GRATIAN
RICHARD J. O'BRIEN
BY W. J. Shanley, Jr.
ATTORNEY

United States Patent Office 3,001,026

Patented Sept. 19, 1961

3,001,026

HALF/FULL TRACK MAGNETIC RECORDING

Joseph W. Gratian and Richard J. O'Brien, Rochester, N.Y., assignors to General Dynamics Corporation, Rochester, N.Y., a corporation of Delaware Filed Aug. 14, 1957, Ser. No. 678,158
10 Claims. (Cl. 179—100.2)

This invention relates to magnetic recording systems and more particularly to a magnetic recording system and electro-magnetic transduced head which are especially suited for performing either half-track or full-track signal translation without requiring separate transducer heads for each type operation.

In order to accomplish half-track or full-track operation with magnetic recording systems heretofore employed, it was generally necessary to have separate interchangeable transducer heads. Consequently, a purchaser had to choose between a full-track system and a half-track system or else select a system having two separate and interchangeable heads, one being for half-track operation and the other being for full-track operation. Since full-track operation gives the best signal to noise ratio, for example, 6 to 8 db higher when limited by equipment noise and half-track operation gives the best recording time per unit cost, it would appear to be highly desirable to be able to perform both types of operation with a single transducer head.

Systems which are capable of performing both types of operations by changing transducer heads are not only more expensive but also suffer from the additional disadvantage of requiring a considerable length of time to change the heads especially when you desire to frequently switch from one type of operation to the other.

It is accordingly an object of our invention to provide a new and improved transducer head which is capable of either half-track or full-track operation.

A further object of the present invention is to provide a magnetic recording system capable of either half-track or full-track operation without necessitating a change of transducer head each time the type of operation is changed.

A further object of the invention is to provide a novel magnetic recording system capable of performing either half-track or full-track operation by merely changing the relative position of the magnetic recording medium with respect to the gap of the transducer head.

In general, we accomplish these and other objects of our invention by providing a head having a full-track gap and a magnetic shunt of at least half-track width on the opposite side of the recording medium from said gap but displaced therefrom to overlie an area adjacent the edge of the gap. The gap and the shunt member are so located that when a full-track tape passes in alignment with the entire length of the gap, full-track electro-magnetic signal translation occurs. However, when a tape having two half-track channels of information and the head are so positioned that the portion of the tape having the wanted channel of information is in contact with half of said gap and the other half of said tape is in proximity to the magnetic shunt, half-track operation is possible. Since the signals on the unwanted channel are shunted away from the gap, the signals in the channel overlying a portion of the gap are reproduced free from crosstalk interference from the adjacent channel.

The illustrated embodiment of the combination half-track and full-track recording head is a modified version of the electron beam pickup head of the type disclosed in Patent 2,725,430 granted November 29, 1955. However, our invention is not limited to this type head but the invention is equally applicable to conventional coil pickup type of heads, as will be hereinafter pointed out.

In accordance with our new and improved recording system, the shifting of the position of the tape or recording medium relative to the transducer head is accomplished by utilizing a two-position tape guiding arrangement in conjunction with the use of spacer discs under the reels. In this way the system is easily converted from one type operation to the other.

The foregoing and other objects and advantages of our invention will become apparent as the following description proceeds, and the features of novelty which characterize our invention will be pointed out with particularity in the claims annexed to and forming a part of this specification.

For a better understanding of our invention, reference may be had to the accompanying drawing in which.

Figure 3:
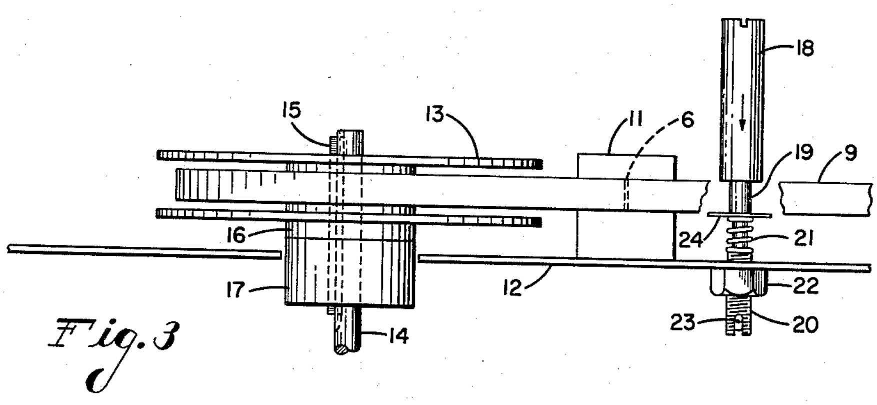
Figure 4:
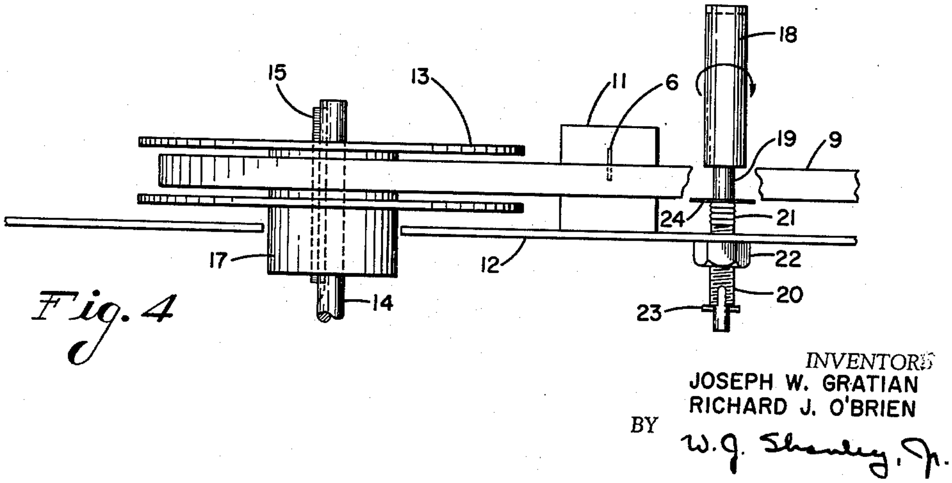

FIG. 3 indicates the physical arrangement of one embodiment of our invention when arranged for full-track operation; and FIG. 4 indicates the physical arrangement of the system when arranged for half-track operation.

The terms "full-track" and "half-track" operation are used herein to define respectively, the relationship whereby the entire length or half the length of the gap respectively, is aligned with a portion of a magnetic medium to thereby provide the two types of electro-magnetic signal translation. Thus, the terms are not used in their more limited sense wherein "full-track" could be limited to the arrangement wherein the length of the gap was approximately equal to the width of the magnetic medium.

Figure 1:
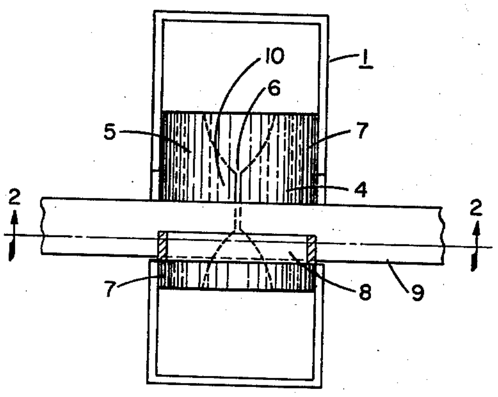
FIG. 1 is a plan sectional view of the embodiment of our invention taken along the line 1—1 of FIG. 2, and with element 7 fragmentarily shown for purposes of clarity.
Figure 2:
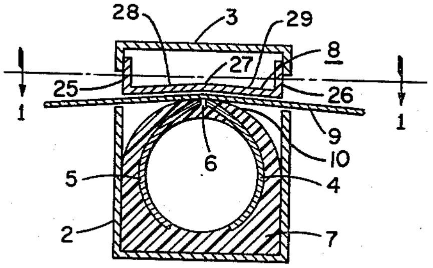
FIG. 2 is a vertical sectional view of the head assembly taken along the line 2—2 of FIG. 1.

The structural arrangement of the preferred embodiment of our transducer head is illustrated in detail in FIGS. 1 and 2. The head assembly is enclosed within a shielding container of low reluctance magnetic material, indicated generally at 1, having a lower portion 2 and a removable upper portion or lid 3. Since the head is of the type designed to operate with a cathode ray tube type pickup device as disclosed in Patent 2,725,430 issued November 29, 1955, the size of the container is such that it would completely enclose the cathode ray tube device and the head assembly in order to shield it from external magnetic fields.

The portion of the head assembly contains C-shaped strip laminations 4 and 5, the confronting ends of which define non-magnetic gap 6. These laminations are formed of low reluctance magnetic material and are imbedded in a block of plastic material in order to permanently maintain their alignment and consequently the non-magnetic gap therebetween. Block 7 has an upper surface 10 which provides a surface of continuous configuration for supporting the tape when it is being driven past gap 6. Referring to FIG. 1, it may be seen that a portion of surface 10 extends beyond both ends of gap 6 thus providing a supporting surface for a magnetic medium which overlaps either end of gap 6.

Further in accordance with our invention, gap 6 has a predetermined length thereby providing full-track operation with respect to a magnetic medium passing in alignment therewith. In accordance with our invention, we also provide a magnetic shunt member 8 of low reluctance magnetic material which is supported above the tape in close proximity thereto by shielding lid 3. Shunt 8 has an arcuate portion 27 and intermediate straight portions 28 and 29 in order that its entire lower surface will be uniformly spaced from magnetic recording medium 9 when the recording medium is in contact with supporting surface 10. This shunt member provides, as the name implies, an alternate or shunt magnetic circuit in parallel with the magnetic circuit linking laminations 4 and 5. These two paths are effectively fed in parallel by the unwanted channel of magnetic medium 9 which acts as a source of flux. Thus, for shunt 8 to be effective for reducing crosstalk, it must provide a path of much lower reluctance than the path which links the laminations. Therefore, we position shunt 8 a uniformly small distance from the unwanted channel on that portion of magnetic member 9 which is within the confines of shielding container 1. On the other hand, it can be seen by referring to FIGS. 1 and 2, that laminations 4 and 5 are separated a greater distance from the unwanted channel of magnetic medium 9. Therefore, the long wavelength signals on the unwanted channel would pick the low reluctance shunt path, thereby preventing the interchannel interference which would arise if the flux linked laminations 4 and 5.

It is a further feature of our invention that not only must shunt member 8 be positionsd as close as possible to the portion of magnetic medium 9 which is within shielding container 1, in order to shunt the unwanted signals emanating from that portion of the tape, but ends 25 and 26 should also be magnetically connected to the shield in order to prevent signals emanating from the tape outside the shield from passing between the ends of shunt 8 and shield 1.

The lateral position of shunt 8 with respect to gap 6 may be better seen by referring to FIG. 1 wherein it is shown that the edge of shunt 8 closest to the end of gap 6 is spaced a small distance away from the end of the gap. For example, when using tapes having a conventional interchannel spacing of approximately 30 mils, this distance would be of the order of 5 mils. Shunt member 8 is half as wide as gap 6 is long. Thus if magnetic medium 9 is passing gap 6 as illustrated in FIG. 1, half of it will be passing under shunt element 8 while the other half of the magnetic medium will be passing over the lower half of gap 6. Assuming that magnetic medium 9 has two half-track channels of information, one being on the upper half and the other being on the lower half, the channel of information passing in contact with gap 6 will be reproduced free of crosstalk interference from the unwanted channel which is passing in proximity to shunt 8. Obviously full-track operation is possible with head assembly 4 if the recording medium is in alignment with the entire length of gap 6. Thus, merely by switching the relative position of head 4 with respect to recording medium 9, it is possible to utilize this head either as a half-track or a full-track reproducing head.

If the full low frequency or long wavelength capabilities of this type of head are to be realized when utilized for full-track operation, magnetic shunt 8 may be removed since it does tend to reduce the low frequency response of the transducer head due to a slight amount of shunting of the full-track signals. Thus we provide that shunt 8 is removably supported at ends 25 and 26 by lid 3 in any conventional manner which would provide a magnetic connection between the shield and shunt. However, if the slightly reduced low frequency response can be tolerated, there would be no necessity for removing shunt element 8. While we have described the shunt element as being removably supported by the lid, it will be recognized that the shunt can be permanently supported at ends 25 and 26 and an interchangeable shielding lid without a shunt may be provided for full-track operation in which no shunt is desired. This lid may be the same type as lid 3 except for the absence of shunt member 8.

The tape contacting surface of head 4 must be able to accommodate a tape having a width dimension of at least the length of gap 6 when the tape is in either of its two positions. We therefore provide that the contacting surface 10 in the region of the gap be at least one and one-half times the width of recording medium 9.

While this aspect of applicants' invention is illustrated with respect to the cathode ray tube type of pickup which has a wavelength response up to several inches, it is also equally efficacious with respect to a conventional pickup head having a usable wavelength response up to approximately a quarter of an inch. Conventional heads having a wavelength response up to that point, when utilized for half-track or full-track operation according to our invention, would also be faced with crosstalk interference that could be minimized by utilizing our shunt member arrangement disclosed in FIGS. 1 and 2. Therefore, we do not intend to be limited to the illustrated embodiment of our invention as shown in FIGS. 1 and 2.

Long wavelength crosstalk from the unwanted channel would also be present with conventional transducer heads having a long wavelength response of less than one-tenth that of the hereinbefore mentioned conventional head. However, since these heads would not be able to reproduce signals having a greater wavelength than the upper limit of its wavelength response, the crosstalk could not be reproduced and consequently would not become objectionable. Therefore, such heads could be used in the system to be hereinafter described with relation to FIGS. 3 and 4. Consequently, it may be seen that the recording system which will be hereinafter described is not limited to the heads provided according to our invention but can also be used with conventional transducer heads of the type hereinbefore referred to.

In accordance with out invention, we provide a magnetic recording system in which the magnetic medium is adjustable to two different positions relative to the transducer head, as illustrated in FIGS. 3 and 4. FIG. 3 illustrates the magnetic recording system of our invention when adjusted for full-track type of operation in which magnetic recording medium 9 is in alignment with the entire length of full-track gap 6 of head 11. Chassis 12 provides support for head 11. Tape supply reel 13 is driven by a motor (not shown) through motor shaft 14 to which it is secured for axial rotation therewith by key member 15. Reel 13 is mounted upon shaft 14 in a conventional manner in order to make it easily removable for changing reels. Spacer disc 16 which is also easily removable from shaft 14 is supported by disc 17. Disc 17 is also secured to shaft 14 for axial rotation by key 15, and in addition, its position along the axis thereof is fixed.

For full-track operation spacer disc 16 is placed upon shaft 14 until its lower surface contacts the upper surface of mounting disc 17 and then in turn the reel 13 is positioned upon the shaft with the lower surface thereof in contact with the upper surface of disc 16. Only one reel is illustrated, although it will be realized that the reel not shown will be adjustable to two different positions in the same manner as being described relative to reel 13.

Since spacer disc 16 is removable from shaft 14, the reel can be conveniently placed in two different positions thereby providing in conjunction with tape guide 18 two different relative positions of the tape with respect to gap 6. FIG. 3 illustrates the reel in position over spacer disc 16 which result in the tape thereon being aligned with the full length of gap 6.

Tape guide 18 has an annular cutout portion 19 which is proportioned to receive recording medium 9 therein. Guide 18 is also capable of assuming two different positions corresponding to the two positions of reel 13. The lower end of tape guiding assembly 18 coaxially slides in a hole in stud 20 and is held in the position illustrated in FIG. 3 by spring 21 which is seated upon the upper surface of stud 20 and bears against the lower surface of the flange 24. Stud 20 is secured to chassis 12 by stop nut 22. Stop nut 22 in conjunction with stud 20 provides a permanent assembly adjustment which insures full tape coverage of the entire length of gap 6. The lower end of the guide assembly 18 has pin 23 inserted therethrough. This pin fits within a grooved portion of stud 20 and rests in the bottom thereof due to the action of spring 21. When pin 23 is in its upper position, that is, the position illustrated in FIG. 3, stop nut 22 is adjusted while both reels are supported by their corresponding spacer discs until the guide assembly aligns recording medium 9 with substantially the full length of gap 6.

Now referring to FIG. 4, in order to convert the system from full-track to half-track operation, the spacer discs are removed from under the reels and the tape guide assembly is depressed until pin 23 clears the bottom of stud 20. It is then revolved a quarter turn in either direction so that the pin will rest upon the bottom of stud 20. The depth of the groove in the bottom of stud 20 is proportioned so that the movement of the tape guide assembly from the bottom of the groove until it rests upon the lower surface of stud 20 will result in the movement of the cutout portion of the guide assembly a sufficient distance so that approximately the upper half of the tape overlies gap 6. Thus, merely by removing the spacer disc and depressing and turning the tape guide assembly, the system is now prepared for half-track operation.

While we have shown and described our invention as applied to specific embodiments thereof, other modifications will readily occur to those skilled in the art. We do not, therefore, desire our invention to be limited to the specific arrangement shown and described, and we intend in the appended claims to cover all modifications within the spirit and scope of our invention.

What is claimed is:

1. A magnetic transducer head in which a magnetic recording medium is transported past said head comprising, a core of magnetic material having a full-track gap therein in contact with said medium, a low reluctance magnetic element of half-track width and means for supporting said element adjacent said recording medium on the other side of said recording medium from said gap, said supporting means positioning said element over an area adjacent said gap.

2. An electro-magnetic transducer head assembly for either half-track or full-track operation, comprising a pair of magnetic pole pieces, a block of non-magnetic material having a magnetic medium supporting surface of continuous configuration, said pole pieces being supported and maintained in a fixed relationship with respect to each other by said block of non-magnetic material to define a non-magnetic gap having a given length dimension, said dimension being transverse to the direction of movement of a recording medium moving in contact with said supporting surface, a magnetic shunt member and means to support said shunt member to overlie only that portion of said supporting surface which would be on the opposite side of a plane from said gap, said plane intersecting one end of said gap in a position normal to the length dimension of said gap.

3. An electro-magnetic transducer head assembly for either half-track or full-track operation comprising, a pair of magnetic pole pieces defining therebetween a non-magnetic gap of given length, a block of non-magnetic material for supporting and maintaining the alignment of said pole pieces, said block having a magnetic medium supporting surface of continuous configuration, said supporting surface having a portion extending beyond one end of said gap a distance equal to one-half the length of said gap, a magnetic shunt member having a width equal to half the length of said gap and means to support said shunt member in an overlying relation with respect to magnetic medium passing in contact with said portion of said supporting surface whereby magnetic medium having a width equal to the length of said gap may be positioned to pass over the entire gap for full-track operation or may be positioned to pass over only half the gap with the remaining portion of the magnetic member passing under the shunt member.

4. A magnetic transducer head in which a magnetic recording medium is transported past said head comprising, a core of magnetic material having a full-track gap therein in contact with said medium, a low reluctance magnetic element of half-track width and means to shield said head from external magnetic fields, said shielding means supporting said element in proximity to said recording medium on the side of said recording medium from said gap and over an area adjacent an end of said gap.

5. A magnetic transducer head in which a magnetic recording medium is transported past said head comprising, a core of magnetic material having a gap therein, said gap being of a given length and having a width dimension parallel to the direction of travel of the recording medium, a continuous non-magnetic surface adjacent an end of said gap, said surface being at least half as wide as said given length, the width dimension of said surface being perpendicular to the direction of travel of the recording medium, a low reluctance magnetic element, said element being half as wide as said given length and means for supporting said element on the opposite side of a recording medium which is in contact with said gap, said supporting means positioning said magnetic element to overlie said continuous surface.

6. A combination half-track or full-track electro-magnetic transducing system comprising an electro-magnetic signal information transducer, magnetic recording medium, means for adjusting the relative position of said transducer with respect to said recording medium, said adjusting means having a first and a second position, means for driving the recording medium past said transducer when said adjusting means is in either of said positions, means including said transducer and medium cooperating to perform full-track electro-magnetic signal translation during the driving of said medium past said transducer when said adjusting means is in said first position and half-track signal translation when said adjusting means is in said second position, said transducing means including means for shunting signals recorded on the half track which is not in signal translation position with respect to said transducing means when said adjusting means is in said second position whereby half-track or full-track operation results by changing the relative position of the transducer with respect to the recording medium.

7. A combination half-track or full-track recording system comprising, electro-magnetic signal information transducing means, a magnetic means including recording medium, said transducing means being prepared to perform full-track signal translation in cooperation with said recording medium when said transducing means and recording medium are in a first position relative to each other and half-track signal translation when said transducing means and recording medium are in a second position relative to each other and means for selectively positioning said transducing means relative to said recording medium in either said first or second position, said transducing means including means for shunting signals on the half track which is not in signal translation position with respect to said transducing means when said transducing means and said recording medium are in said second position.

8. A magnetic recording system comprising, an electro-magnetic signal information transducer head having pole pieces of magnetic material the confronting ends of which form a non-magnetic gap, said gap having a given length, a magnetic recording medium having a width at least equal to said given length, means for positioning said recording medium relative to said gap in a first or second position, said first position resulting in the recording medium being aligned with the entire length of said gap to thereby prepare said head and magnetic medium for full-track operation and said second position resulting in a first half of said recording medium being aligned with said gap, said transducer head including means for shunting signals on the half of said recording medium adjacent said first half to thereby prepare said head and magnetic medium for half-track operation.

9. A magnetic recording system comprising, a magnetic recording medium of given width, a pair of pole pieces the confronting ends of which form a non-magnetic gap having a length substantially equal to the width of said recording medium, means for positioning said recording medium relative to said gap in a first or second position, said first position resulting in the magnetic medium being in contact with the entire length of said gap, said second position resulting in one-half the recording medium being in contact with said gap, a low reluctance magnetic element and means for supporting said magnetic element on the opposite side of said recording medium from said gap in a position to overlie the other half of said recording medium when said positioning means is in its second position.

10. A magnetic recording system comprising, a magnetic recording medium of given width, a pair of pole pieces the confronting ends of which form a non-magnetic gap having a length substantially equal to the width of said recording medium, means for positioning said recording medium relative to said gap in a first or second position, said first position resulting in the magnetic medium being in contact with the entire length of said gap, said second position resulting in one-half the recording medium being in contact with said gap, a low reluctance magnetic element, means for shielding said pole pieces from external magnetic fields, said shielding means supporting said magnetic element on the opposite side of said recording medium from said gap in a position to overlie the other half of said recording medium when said positioning means is in its second position.

References Cited in the file of this patent

UNITED STATES PATENTS

| | | |
|---|---|---|
| 2,423,339 | Newman | July 1, 1947 |
| 2,530,584 | Pontius | Nov. 21, 1950 |
| 2,540,406 | Ranger | Feb. 6, 1951 |
| 2,610,257 | Wissmann | Sept. 9, 1952 |
| 2,628,285 | Camras | Feb. 10, 1953 |
| 2,697,135 | Gratian | Dec. 14, 1954 |

UNITED STATES PATENT OFFICE

CERTIFICATE OF CORRECTION

Patent No. 3,001,026 September 19, 1961

Joseph W. Gratian et al.

It is hereby certified that error appears in the above numbered patent requiring correction and that the said Letters Patent should read as corrected below.

Column 1, line 11, for "transduced" read -- transducer --; column 6, line 47, strike out "means including" and insert the same after "medium," in line 48, same column 6.

Signed and sealed this 27th day of February 1962.

(SEAL)
Attest:

ERNEST W. SWIDER
Attesting Officer

DAVID L. LADD
Commissioner of Patents